Nov. 15, 1932.  J. R. PEIRCE  1,887,848
COFFEE BREWING DEVICE
Filed Nov 28, 1928    3 Sheets-Sheet 1

INVENTOR
BY John Royden Peirce
ATTORNEY

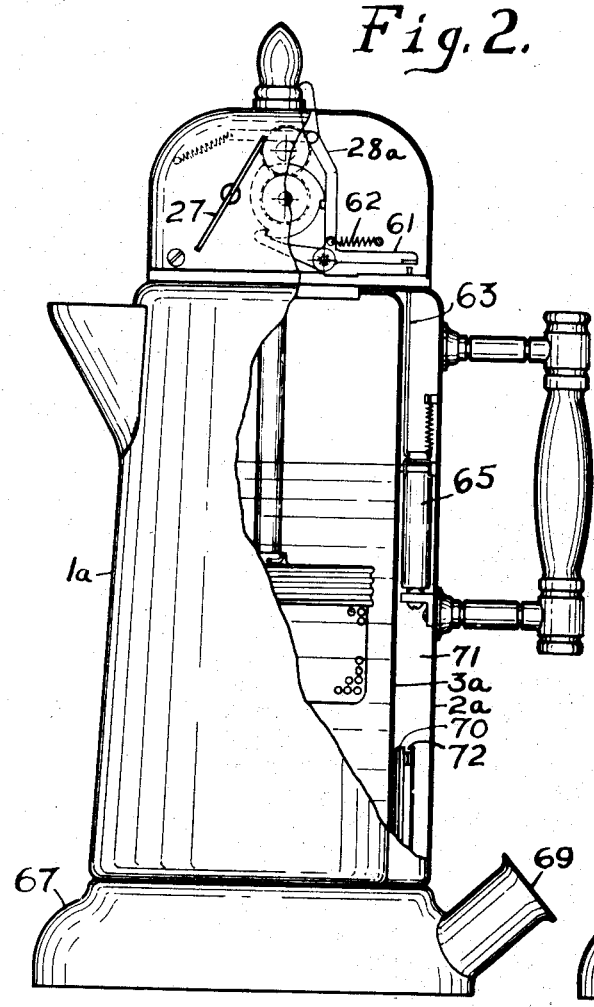
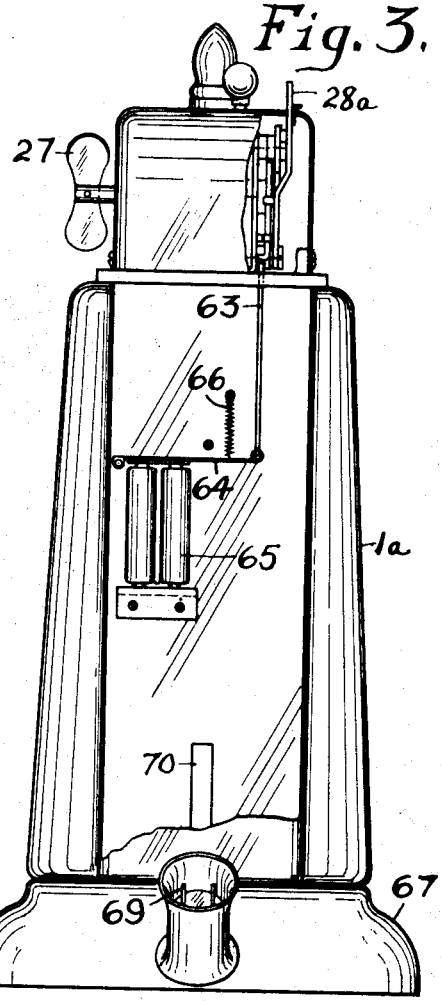
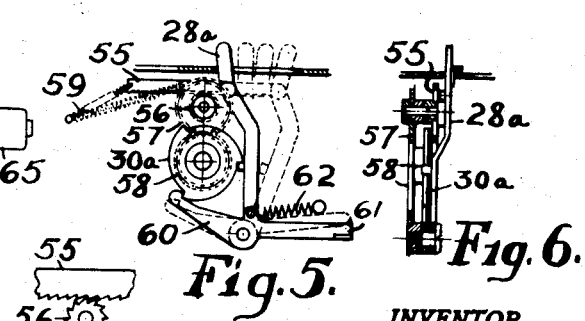

Nov. 15, 1932.        J. R. PEIRCE        1,887,848
COFFEE BREWING DEVICE
Filed Nov 28, 1928    3 Sheets-Sheet 3
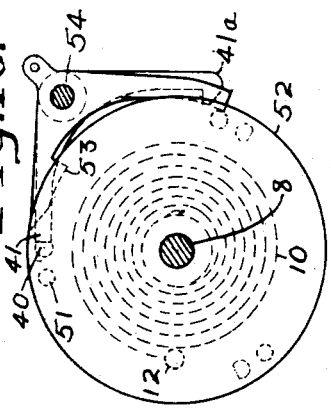
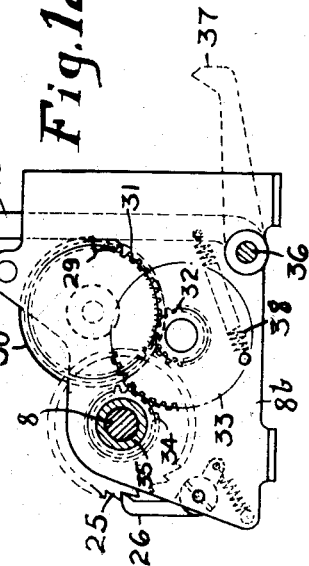
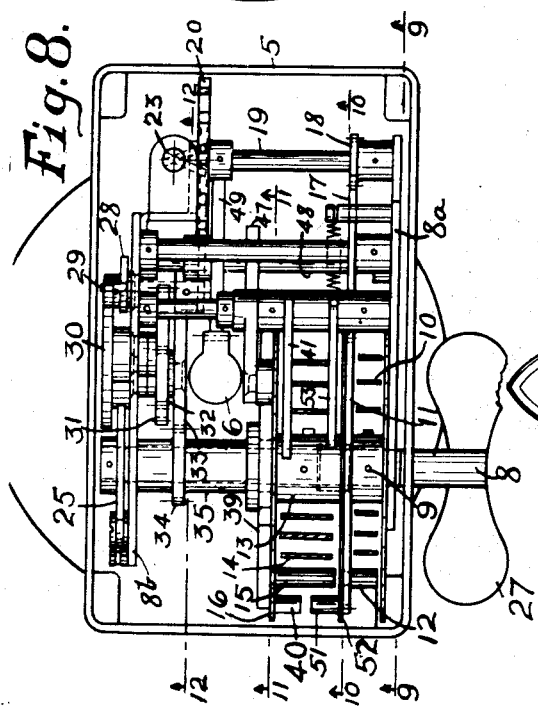
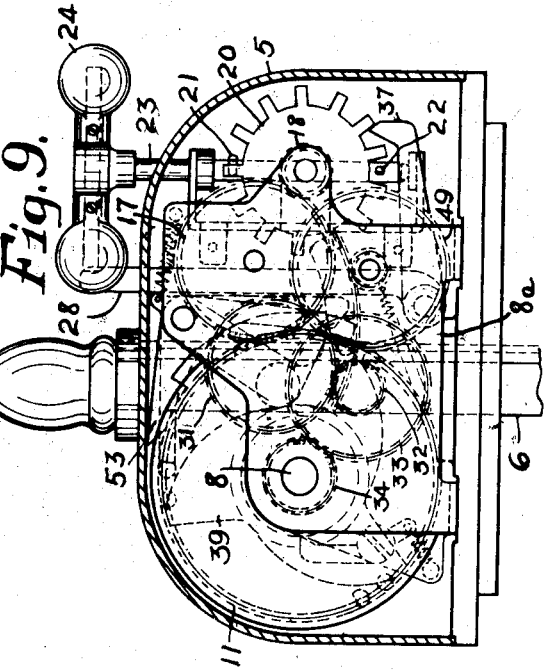
INVENTOR
John Royden Peirce
BY
ATTORNEY Patented Nov. 15, 1932

1,887,848

UNITED STATES PATENT OFFICE

JOHN ROYDEN PEIRCE, OF NEW YORK, N. Y.

COFFEE BREWING DEVICE

Application filed November 28, 1928. Serial No. 322,372.

This invention relates to a method and means for the making of coffee.

In my copending application for coffee pots, Serial No. 224,899, filed October 8th, 1927, I disclosed a coffee pot comprising an outer container for hot water and an inner container for the coffee grounds, with means for raising the grounds and to remove them from the water after a predetermined time.

According to the present invention, means are provided for raising the container with the grounds more rapidly and to then dip the grounds into the water again; repeating this cycle several times. This method induces more rapid relative movement between the grounds and the water and effects a more rapid diffusion. I have found that this not only produces the coffee beverage in much less time, but also produces much better coffee.

Referring to the drawings wherein I have shown what I now consider to be the preferred form of my invention:

Fig. 2 is a view of a pot provided with thermostatic control devices.

Fig. 3 is a rear view of the pot shown in Fig. 2.

Fig. 4 is a wiring diagram of the thermostatic control devices shown in Figs. 2 and 3.

Fig. 5 is a detail of a latch by which the operation of the mechanism is controlled.

Fig. 6 is a view of the latch, looking at Fig. 5 from the right.

Fig. 7 is a detail of part of the latching mechanism shown in Figs. 5 and 6.

Fig. 8 is a section of the cover portion of the pot taken on line 8—8 of Fig. 1 and showing the mechanism for lowering and raising the grounds container.

Fig. 9 is a section of this portion taken on line 9—9 of Fig. 8.

Fig. 10 is a section taken on line 10—10 of Fig. 8 showing a spring-actuated part and escapement latches therefor, other mechanisms being omitted.

Fig. 11 is a section taken on line 11—11 of Fig. 8 showing part of the mechanism for lowering and raising the grounds container, other parts being omitted.

Fig. 12 is a section taken on line 12—12 of Fig. 8 showing parts of the lowering and raising mechanism, including a latch for latching the parts against operation until actuated to permit operation.

Figure 1:
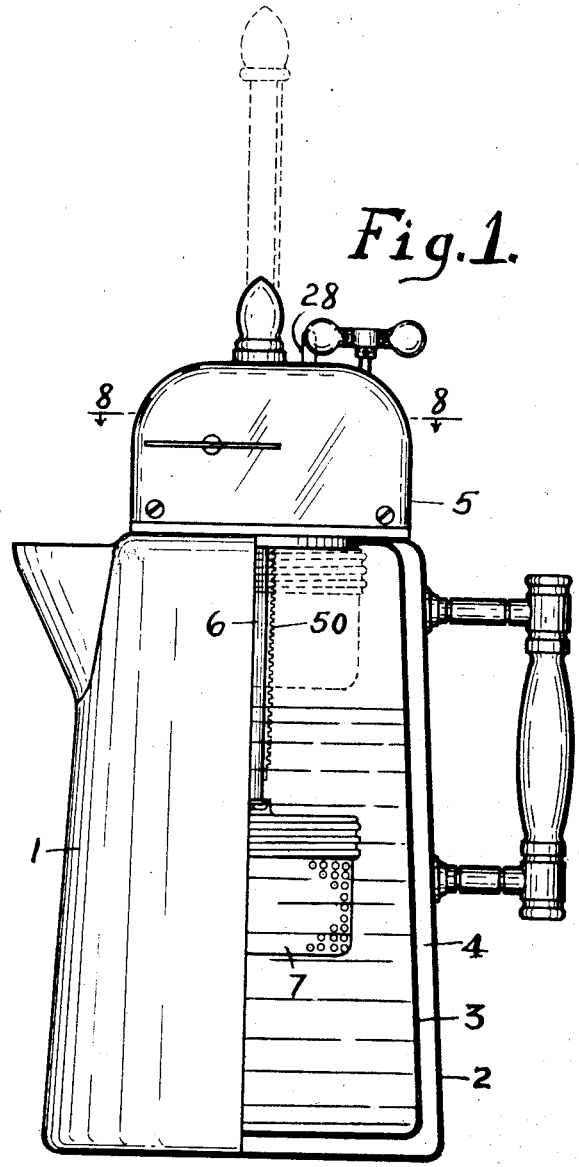
Fig. 1 is a side elevation of a coffee pot embodying my invention, part being broken away to show the construction of the pot and the interior thereof.

In Fig. 1, the pot is shown as outer and inner walls 2 and 3 with a space 4 between to form a thermos container. The cap 5 supports a depending rod 6, to the lower end of which is attached the inner perforated or basket container 7 for the coffee grounds. The mechanism within the cap for actuating the rod 6 to raise and lower the basket is shown in Figs. 8 and 9. A shaft 8 rotatably mounted in side plates 8—a and 8—b in the cap has fixed thereon a hub 9, to which one end of a spring 10 is attached. A disc 11, loose on the shaft, has a stud 12 to which the other end of spring 10 is attached. Also fixed on shaft 8 is a hub 13 to which one end of a spring 14 is attached, the other end being attached to a stud 15 fixed to a disc 16 loose on shaft 8. The disc 11 is provided with teeth to form a gear and meshes with a gear 17, which in turn meshes with pinion 18 fixed on shaft 19 with escapement wheel 20. The prongs of the escapement wheel are adapted to alternately engage pins 21, 22 on a shaft 23 to oscillate the shaft. Inertia or governor weights 24 on the shaft 23 control the speed of oscillation and thus determine the speed of rotation of escapement 20 and gear disc 11. One end of shaft 8 has fixed thereon a ratchet 25 (see also Fig. 12) with which a spring pressed holding pawl 26 cooperates. Turning of the handle 27 on the other end of shaft 8 will effect winding of the springs 10 and 14, and the ratchet and pawl will prevent turning backward. The disc 16, to which the outer end of spring 14 is attached, will now be held against turning by a latch arm 28 having a projection 29 engaging in a notch of a wheel 30. This wheel is fixed on a shaft, bearing in the supporting or frame plate 8—b. Also fixed on the shaft is a gear 31 meshing with a pinion 32 which in turn is fixed on the same shaft with a gear 33 meshing with a pinion 34 fixed on a hub 35. Said hub is loose on shaft 8 and is fixed to the disc 16. Thus, the spring 14 acting upon disc 16 tends to turn the train of gears and the wheel 30, but is prevented from doing so by the latch 28. At such time the stem 6 with the basket 7 is in the upper position as shown in dotted lines in Fig. 1. Fixed on the same shaft 36 with latch cam 28 is another latch 37 adapted to engage the escapement wheel 20 to lock it against operation when the wheel 30 is locked. A spring 38 tends to hold the latches in their locking positions. Thus, when the springs 10 and 14 are wound up, the pawl 26 will prevent the shaft 8 from turning backward while the latches 28 and 37 will prevent the mechanism from operating. To cause the parts to operate, the arm 28 may be moved to the right as viewed in Figs. 9 and 12. This permits spring 14 to commence to turn the disc 16 and with it the cam 39 fixed with respect to the disc. After moving but a short distance, a stud 40 in the disc 16, which was slightly to the left of the position shown in Fig. 10, strikes the end of the upper arm 41 of a bell crank, which stops these parts from operating. The cam 39 will now have moved clockwise to the position of Fig. 11, and the follower 42 which had been resting against the outer point 43 of the cam has been released to move to the left to the position of Fig. 11. The follower 42 is carried by the arm 44 of a segmental gear 45 pivoted at 46. Gear 45 meshes with pinion 47 fixed on the same shaft 48 with a gear 49, which in turn meshes with a toothed rack 50 fixed on the stem 6. The weight of the stem 6 and the basket 7 causes the gear 49 to turn when the follower is freed, moving the follower to the left as stated. In the meantime, the spring 10, through its train of gears, causes the escapement wheel 20 to turn slowly under control of the governor balls 24. A stud 51 in a plate 52 fixed to the side of gear 11 will presently engage the cam surface of a bell crank 53 fixed on the shaft 54 with the latch 41. The parts will be rocked upwardly so that the stud 40 will be released. Spring 14 will again cause cam 39 to turn clockwise, moving follower 42 to the right. Segment gear 45 will turn pinion 47 and gear 49 and this will actuate rack 50 to raise the stem 6, lifting the basket 7 to its upper position out of the water. The raising of the arm 41 of the bell crank latch will have moved the lower arm 41—a thereof to the left. This arm is a hook adapted to be engaged by stud 40 when, by reason of the turning of disc 16, it shall have reached this position. At such time the operation of spring 14 will again stop, stopping cam 39 where the outer portion 43—a is in engagement with follower 42, holding the basket in its upper position and permitting the water to drip from the grounds. As the stud 51 continues to move, it will soon cam the lower arm 53—a of bell crank 53 to the right, moving latch 41—a away from stud 40. The cam 39 will again turn to release follower 42 and permit the basket to descend.

The next one of the three equally spaced studs 40 on disc 16 will now rest against arm 41 which has been lowered and will hold cam 39 in this position until the next stud 51, of which there are also three on disc 52, lifts the arm 53 and permits the basket to be raised again. This cycle of lowering and raising of the basket will be repeated a number of times until the spring 10 or spring 14 runs down, and may be varied by varying the tension to which the springs are wound. Or preferably, after disc 30 has turned one complete revolution, the latch arm 28 stops it with the basket in its raised position.

Also, as shown in Figs. 2, 3, 5, 6 and 7, instead of the latching disc 30, I may employ a disc 30—a having three latching shoulders to cooperate with the projection on the latch arm 28—a. A ratchet bar 55 attached at one end to latch arm 28—a cooperates with ratchet pinion 56 fixed with respect to a gear 57 meshing with a gear 58 fixed on the same shaft as latch disc 30—a. A spring 59 tends to pull bar 55 to the left. When arm 28—a is moved to the right to permit the parts to operate, the bar 55 will move freely over ratchet 56. The ratchet will hold the bar, and as the parts turn, the ratchet will turn counter-clockwise slowly, permitting the bar to move to the left. After latch arm 28—a has moved sufficiently close to disc 30—a, the next shoulder thereon will engage the projection on latch arm 28—a and the operation will stop. The duration of operation may be varied by varying the extent to which latch 28—a is moved to the right.

Means may also be provided for preventing operation of the device when the water in the pot is below a predetermined temperature. This may comprise a latch 60 having a rearwardly extending arm 61 and a spring 62 tending to hold the latch against disc 30—a. Below arm 61 is a rod 63 attached to the armature 64 of an electro-magnet 65, the energization of which is controlled by the temperature of the water. When the temperature rises to a predetermined point, the magnet becomes de-energized and a spring 66 raises armature 64 and rod 63. This rocks latch 60 out of contact with disc 30—a. If, when latch 28—a is moved to the right, the water is not yet up to proper heat, latch 60 prevents operation of the dipping mechanism. As soon as the latch 60 releases, however, the parts will commence to operate.

Within the base 67 (Figs. 2 and 3) of the pot 1—a, an electric heating grid may be provided. The grid is not shown in the base as such grids are well known, but it is indicated at 68 in the wiring diagram in Fig. 4. Provision is made at 69 for plugging in from an outside source.

A bimetallic thermostat 70 may be provided in the space 71 between the inner and outer walls 2-a and 3-a of the pot. The thermostat controls the opening and closing of contacts 72. Included in the circuit, beside the magnet 65, may be a magnet 73, although one magnet may serve both purposes. Magnet 73 is adapted to open contacts 74. In operation, when the water in the pot attains the desired temperature, contacts 72 will close and cause energization of magnets 73, 65. The resultant opening of contacts 74 breaks the circuit through grid 68. At the same time, magnet 65 causes latch 60 to release disc 30-a so that when latch arm 28-a is moved to the right, the mechanism may commence to operate.

I claim:

1. A device for making coffee comprising an outer and an inner container, means for automatically effecting reciprocatory relative movement between said containers and thermostatic control means for automatically controlling said first named means.

2. In a device of the character described, a water container, a grounds container therein, means for causing intermittent relative movement between said containers and thermostatic control means for automatically controlling said first named means.

3. In a device of the character described, an outer and an inner container, power means for intermittently raising and releasing said inner container, time and thermostatic controlled means for controlling said power means.

4. In a device of the character described, an outer and an inner container, means for causing intermittent raising and lowering of said inner container, manual control means for controlling the operation of said first named means and temperature control means for also controlling said first named means.

5. In a device of the character described, an outer and an inner container, means for causing alternate rising and falling of said inner container, means for controlling the duration of such rising and falling and thermostatic control means for controlling said first named means.

6. In a device of the character described, a pot, a grounds container within the pot, mechanism for moving the container, manually actuated means for controlling the operativeness of said mechanism and additional thermostatic means for controlling the operativeness of the mechanism.

In testimony whereof I have affixed my signature.

JOHN ROYDEN PEIRCE.